United States Patent [19]

Suzuki et al.

[11] Patent Number: 4,805,024
[45] Date of Patent: Feb. 14, 1989

[54] STILL IMAGE PICKUP CAMERA USING HIGH SPEED CLEAR PULSES TO DEFINE A STORAGE INTERVAL CORRESPONDING TO A DESIRED SHUTTER SPEED

[75] Inventors: Masatoshi Suzuki, Shiga; Yoshimasa Fujikawa; Koichi Fujimoto, both of Kyoto, all of Japan

[73] Assignee: Omron Tateisi Electronics Co., Kyoto, Japan

[21] Appl. No.: 42,818

[22] Filed: Apr. 27, 1987

[30] Foreign Application Priority Data

May 1, 1986 [JP] Japan .................. 61-101740

[51] Int. Cl.⁴ .................................. H04N 3/14
[52] U.S. Cl. .................. 358/213.19; 358/213.26
[58] Field of Search .......... 358/213.19, 213.26; 357/24 LR

[56] References Cited

U.S. PATENT DOCUMENTS

| | | | |
|---|---|---|---|
| 3,931,463 | 1/1976 | Levine | 358/213.19 |
| 4,245,164 | 1/1981 | Funahashi | 357/24 LR |
| 4,499,496 | 2/1985 | Tanaka | 358/213 |
| 4,531,156 | 7/1985 | Nishizawa | 358/213 |
| 4,574,309 | 3/1986 | Arisawa | 358/212 |
| 4,644,403 | 2/1987 | Sakai et al. | 358/213.26 |
| 4,651,215 | 3/1987 | Bell et al. | 358/213.26 |
| 4,663,669 | 5/1987 | Kinashita et al. | |

FOREIGN PATENT DOCUMENTS 3138240 4/1983 Fed. Rep. of Germany.

Primary Examiner—Jin F. Ng
Assistant Examiner—Stephen Brinich
Attorney, Agent, or Firm—Stevens, Davis, Miller & Mosher

[57] ABSTRACT

A still image pickup camera has a solid state image pickup device comprising an image pickup area, a temporary storage area, and a horizontal shift register. The signal charges in the image pickup area are transferred to the temporary storage area by the transfer pulses which are given for a vertical blanking period. Clear pulses which are equivalent to the transfer pulses are given at a desired timing in the interval between the vertical sync signals so as to enable the photo sensing interval (storage interval) in the image pickup area to be reduced and varied, thereby transferring the signal charges in the image pickup area to the temporary storage area and clearing the image pickup area.

3 Claims, 4 Drawing Sheets

STILL IMAGE PICKUP CAMERA USING HIGH SPEED CLEAR PULSES TO DEFINE A STORAGE INTERVAL CORRESPONDING TO A DESIRED SHUTTER SPEED

BACKGROUND OF THE INVENTION

The present invention relates to a still image pickup camera using a CCD solid state image pickup device of the frame transfer (FT) type or interline type and, more particularly, to a camera of this type for photographing an instantaneous still image of an object and outputting a still video signal indicative of the still image.

The CCD solid state image pickup device of the FT type comprises: an image pickup area (photo sensing area) to be exposed; a temporary storage area to temporarily store the signal charges transferred from the image pickup area; and a horizontal shift register to read out the video signal from the temporary storage area. Transfer electrodes are vertically arranged for those areas and shift register. The temporary storage area and shift register are shielded against light by a metal film or the like through a thin insulating film.

Prior to photographing an object, first high-speed transfer pulses as many as the number of pixels in the vertical direction are given for the vertical blanking period, the signal charges of one field of the image pickup area are transferred to the temporary storage area to clear the image pickup area. Thus, the storage of the signal charges of the next one field is started in the image pickup area. In the image pickup area, the storage of the signal charges of one field is continued until the next vertical sync signal appears. Namely, the storage interval of the signal charges is equal to one field interval and is 1/60 seconds ($\approx$16.7 msec).

In the one field interval when the signal charges are stored in the image pickup area, the second transfer pulse is given to the temporary storage area every horizontal sync signal. The signal charges transferred from the image pickup area to the temporary storage area are transferred to the horizontal shift register. Namely, the image data of one horizontal line is transferred to the horizontal shift register in response to one second transfer pulse.

The image data of one horizontal line transferred to the horizontal shift register is output to the outside every pixel data in response to every input of one third transfer pulse. Since the third transfer pulses of the number larger than the number of pixels of one horizontal line are given for one horizontal scan period, all of the image data of one horizontal line is output as a video signal output to the outside within one horizontal scan period from the input of the preceding horizontal sync signal to the input of the next horizontal sync signal. In one field interval, all image data of one field which has already been stored in the temporary storage area is output as a serial video signal.

The storage interval of the signal charges in the image pickup area is equal to one field interval and is constant. This one field interval corresponds to the shutter speed. In this case, it is the fixed shutter speed (1/60 sec). Therefore, in the case of a moving object, an instantaneous moving object cannot be photographed as a still image, causing an inconvenience in that the photographed image is slightly blurred.

Hitherto, the following methods have been used in order to enable a storage interval corresponding to the shutter speed of, e.g., 1/500 sec or 1/1000 sec to be obtained in accordance with the moving speed of a moving object.

(1) A mechanical shutter is provided between the photographing lenses and the CCD solid state image pickup device.

(2) An electronic shutter constituted by a PLZT which mainly consists of the components of Pb, La, Zr, and Ti is provided.

(3) A stroboscopic flash is used.

(4) The CCD solid state image pickup device is scanned at a high speed.

However, these methods have the following problems, respectively.

In the case of the mechanical shutter, the life is short, the structure is complicated, and it is difficult to reduce the size and cost. In the case of the PLZT electronic shutter, the light amount remarkably decreases because the polarized light is used and, on the other hand, a pulse voltage of hundreds of volts is needed as a voltage to be applied to the shutter. The stroboscopic flash is expensive and can be used only under a dark circumferential condition, so that the use condition is limited and the flash light gives an unpleasant feeling to the person to be photographed. In the case of scanning the CCD solid state image pickup device at a high speed, the peripheral circuits must be also made operative at a high speed and such a high-speed operation is technically difficult.

SUMMARY OF THE INVENTION

It is an object of the present invention to provide a still image pickup camera having a simple constitution in which the cost and size can be easily reduced and the life is long and no special light source is necessary.

A still image pickup camera according to the invention comprises: a solid state image pickup device having an image pickup area, a temporary storage area, and a horizontal shift register; clock generating means for outputting within a vertical blanking period a group of first high-speed transfer pulses to transfer the storage signal charges of one field in the image pickup area into the temporary storage area, for outputting within one field interval a group of second transfer pulses to transfer the storage signal charges of one field in the temporary storage area to the horizontal shift register by the amount of every horizontal line synchronously with a horizontal sync signal, and for outputting every horizontal scan period a group of third high-speed transfer pulses to transfer the image data of one horizontal line, by the amount of every pixel, which has been transferred to the horizontal shift register; and clear pulse generating means for generating a group of high-speed clear pulses one or more number of times to transfer the storage signal charges of one field in the image pickup area to the temporary storage area to clear the image pickup area at a desired timing between the adjacent vertical sync signals.

The image pickup area is cleared by the group of clear pulses at a desired timing between the preceding vertical sync signal and the next vertical sync signal. The interval after the image pickup area was cleared by the clear pulses until the next vertical sync signal is generated is equal to the storage interval of the actual signal charges. Hitherto, the interval between the adjacent vertical sync signals, namely, one field interval is equal to the storage interval. Therefore, according to the invention, the storage interval can be reduced and can be arbitrarily set.

Since the storage interval corresponds to the shutter speed, the reduction of the storage interval results in the high shutter speed. Therefore, it is possible to obtain a high shutter speed of 1/500 sec or 1/1000 sec, which could not be conventionally obtained without using an externally attached shutter such as, e.g., a mechanical shutter or the like. Since the high shutter speed can be derived by using the clear pulses, the mechanical shutter, PLZT electronic shutter, stroboscopic flash, or the like which was needed in the conventional camera is unnecessary. In addition, there is no need to scan the CCD solid state image pickup device at a high speed.

According to the invention, clear pulses are used to obtain the high shutter speed by reducing the storage interval and it is sufficient to merely add a clear pulse generator. Therefore, as compared with the conventional mechanical shutter, the constitution can be simplified, the cost and size can be reduced, and the life can be prolonged. In addition, there is no need to use the stroboscopic flash and the limitation of the use condition can be lightened. The deterioration of the sensitivity as in the case of the PLZT electronic shutter can be prevented.

DESCRIPTION OF PREFERRED EMBODIMENTS

Figure 1:
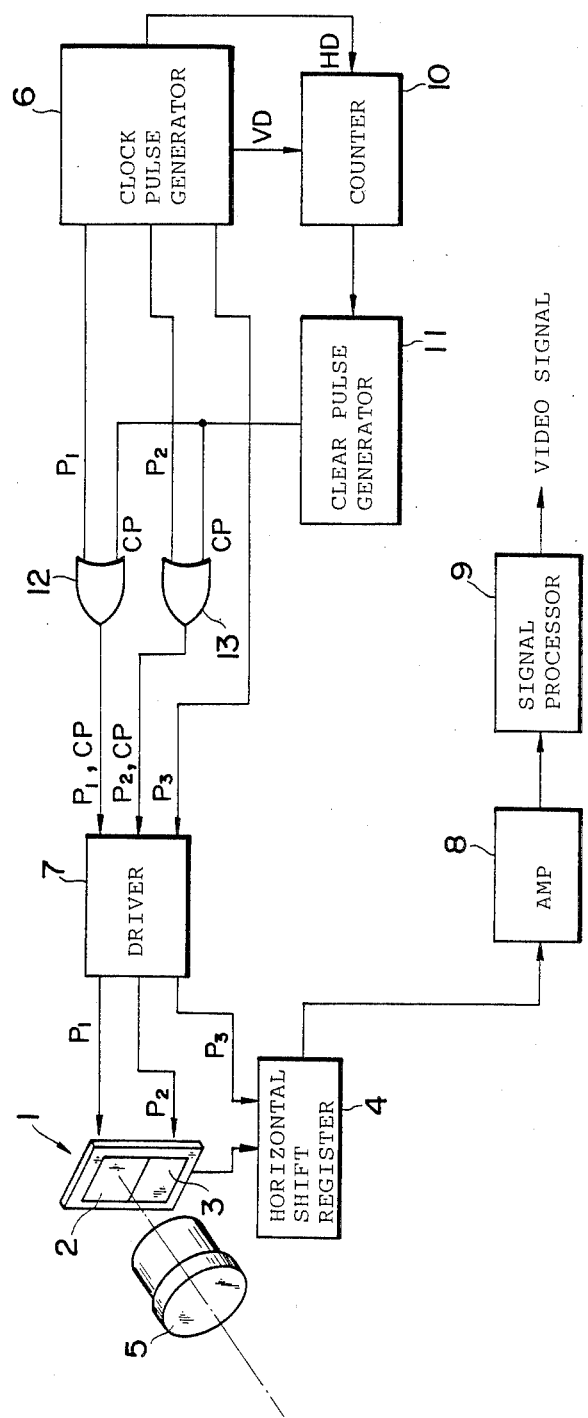
FIGS. 1 and 2 show an embodiment of the present invention, FIG. 1 being a block diagram showing a schematic constitution of a still image pickup camera and FIG. 2 being a time chart for explaining the operation of the camera of FIG. 1.
Figure 2:
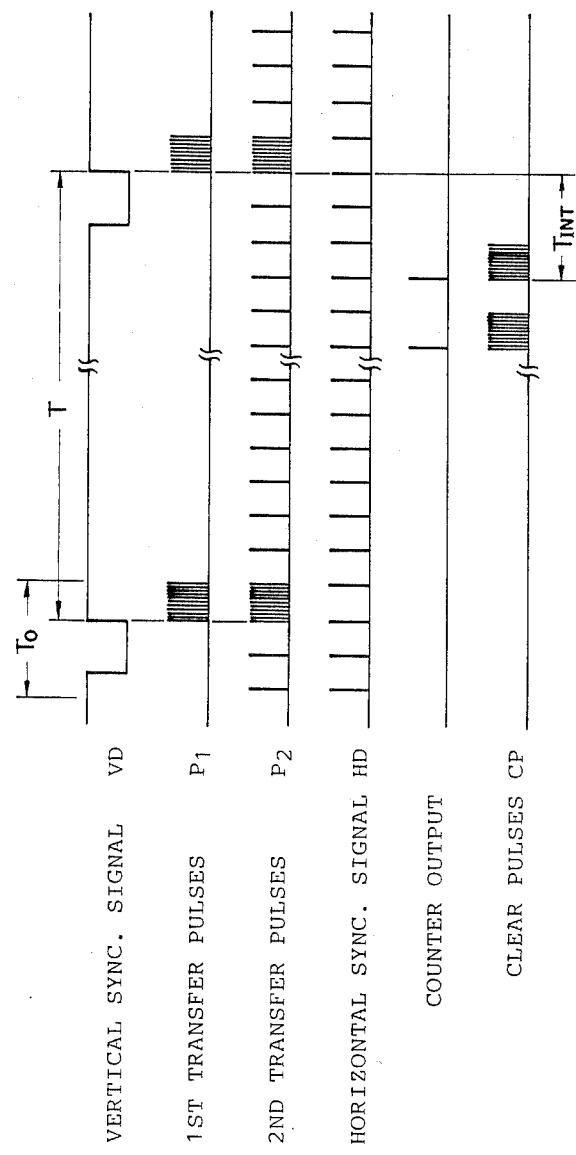

FIG. 1 is a block diagram showing an embodiment of the present invention. FIG. 2 is a time chart for explaining the operation thereof.

As is well known, a CCD solid state image pickup device 1 of the FT type comprises an image pickup area 2, a temporary storage area 3, and a horizontal shift register 4 to read out the image data. An image pickup optical system 5 including lenses is disposed in front of the CCD 1. The CCD is driven by a driver 7. Three kinds of transfer pulses $p_1$, $P_2$, and $P_3$ are supplied from a clock pulse generator 6 to the driver 7. The first transfer pulses $P_1$ are used to transfer the signal charges in the image pickup are 2 to the temporary storage area 3 and are the high-speed pulses as many as the number of vertical pixels, which are output for a vertical blanking period $T_0$. The second transfer pulses $P_2$ include two kinds of pulses: namely, the high-speed pulses which are output for the same period $T_0$ as period when the first transfer pulses $P_1$ are generated and the pulses which are output synchronously with the horizontal sync signal. Both of these pulses $P_2$ are used to transfer the signal charges in the temporary storage area to the horizontal shift register 4. The third transfer pulses $P_3$ are used to horizontally transfer the signal charges (image data) of one horizontal line, by the amount of every pixel, which have been transferred to the horizontal shift register 4. The transfer pulses $P_3$ whose number is equal to or larger than the number of pixels in the horizontal direction are output within one horizontal scan period. The output pulses $P_1$ and $P_2$ of the generator 6 are sent to the driver 7 through OR gates 12 and 13, respectively.

The image data which was serially read out of the horizontal shift register 4 is amplified by an amplifier 8 and thereafter, it is supplied to a signal processor 9 and is subjected to predetermined processes. Thus, the video signal having a predetermined format is output.

The foregoing constitution has conventionally been well known.

In the invention, a counter 10 and a clear pulse generator 11 are provided. The clock pulse generator 6 generates a vertical sync signal VD and a horizontal sync signal HD. The counter 10 is cleared in response to the input of the vertical sync signal VD and starts counting the horizontal sync signals HD which are input thereafter. The counter 10 has two preset values and when the count values coincide with these two preset values, respectively, the counter 10 generates an output signal. Those two preset values are different from each other and are smaller than the number of horizontal sync signals HD which are output in one field interval T. These two preset values are variable and can be arbitrarily set.

When the output signal of the counter 10 is input, the clear pulse generator 11 operates and continuously outputs high-speed clear pulses CP of a number larger than the number of pixels in the vertical direction (which is equal to the number of pixels in the vertical direction of the temporary storage area 3) of the image pickup area 2 of the CCD 1. The clear pulses CP are sent to the driver 7 through the OR gates 12 and 13, respectively.

The first transfer pulses $P_1$ which were continuously output from the clock pulse generator 6 in the vertical blanking period $T_0$ are supplied to the CCD image pickup area 2 through the OR gate 12 and driver 7. At the same time, the second transfer pulses $P_2$ (the high-speed pulses which were continuously output from the generator 6 are supplied to the CCD temporary storage area 3 through the OR gate 13 and driver 7. Thus, all of the image data (signal charges) of one field stored in the temporary storage area 3 is transferred to the horizontal shift register 4 to vanish and no image data exists in the area 3. In place of this data, all of the image data of one field which has been stored in the image pickup area 2 is transferred to the temporary storage area 3 and stored therein. Thus, the storage of the signal charges of the next one field is started in the cleared image pickup area 2.

The storage of the signal charges in the image pickup area 2 (this storage will be invalidated later) is continued until a predetermined time point before the next vertical sync signal VD is output, namely, until the time point when the clear pulses CP are generated.

On the other hand, the counter 10 is cleared by the vertical sync signal VD and starts counting the horizontal sync signals HD. When the count value coincides with the smaller one of the two preset values, a drive signal is output from the counter 10 to the clear pulse generator 11. Thus, the clear pulse generator 11 performs the first generation of the high-speed clear pulses CP of the number larger than the number of pixels in the vertical direction of the image pickup area 2. These clear pulses CP are supplied to the image pickup area 2 and temporary storage area 3 through the OR gates 12 and 13, respectively.

Thus, all of the image data (signal charges) of one field which has been stored in the temporary storage area 3 is transferred to the horizontal shift register 4 and vanishes. All of the image data of one field which has been stored in the image pickup area 2 is transferred to the temporary storage area 3 and stored therein. The completion of the transfer of the signal charges to the temporary storage area 3 results in that the image pickup area 2 is again cleared.

Next, when the count value of the counter 10 coincides with the larger one of the two preset values, a drive signal is again fed from the counter 10 to the clear pulse generator 11. Thus, the generator 11 performs the second generation of the high-speed clear pulses CP as many as the number of preceding clear pulses CP. The clear pulses CP are supplied to the image pickup area 2 and temporary storage area 3 through the OR gates 12 and 13, respectively.

Consequently, all of the image data (signal charges) of one field which has been stored in the temporary storage area 3 is transferred to the horizontal shift register 4 and no image data exists in the area 3. At the same time, the image data of one field is transferred from the image pickup area 2 to the temporary storage area 3. However, all pixels in the image pickup area 2 are cleared at the time of the first generation of the clear pulses CP. Subsequent to the first generation of the clear pulses CP, the second generation of the clear pulses CP is soon performed. Therefore, the charges are hardly stored into the image pickup area 2 and the image data which is transferred to the temporary storage area 3 is the non-signal data. On the other hand, all pixels in the image pickup area 2 are also cleared when the second group of clear pulses CP are output. This is equivalent to that the shutter has been closed for the period of time after the time point of the output of the vertical sync signal VD until the time point when the image pickup area 2 is cleared by the second group of clear pulses CP.

Immediately after the image pickup area 2 was cleared by the second generation of the clear pulses, the storage of the signal charges is started in the image pickup area 2. This storage is continued until the next vertical sync signal VD is output. Namely, the storage interval of the signal charges to be actually output as a video signal is the interval $T_{INT}$ from the time point of the second clearing operation to the generation of the next vertical sync signal VD.

By varying the two preset values in the counter 10, the storage interval $T_{INT}$ can be adjusted and can be set to, e.g., 1/500 sec or 1/1000 sec.

The storage interval $T_{INT}$ corresponds to the shutter speed and may be set to a short storage interval $T_{INT}$ if the moving speed of a moving object is fast. In this way, the moving object can be photographed as a still image without a blur.

When the next vertical sync signal VD is output, the signal charges (although the signal charges hardly exist as mentioned above) in the temporary storage area 3 are transferred to the horizontal shift register 4 by the high-speed transfer pulses $P_2$ to vanish, so that no signal charge exists in the area 3. At the same time, the signal charges stored in the image pickup area 2 for the interval $T_{INT}$ are transferred by the high-speed transfer pulses $P_1$ to the temporary storage area 3. The second high-speed transfer pulses $P_2$ are not always necessary.

The signal charges transferred to the temporary storage area 3 are transferred to the horizontal shift register 4 by the amount of every horizontal line in response to the second transfer pulses $P_2$ which are given synchronously with the horizontal sync signals. The signal charges (image data) transferred to the horizontal shift register 4 are serially read out by the third transfer pulses $P_3$ and given to the amplifier 8. All of the image data of one field indicative of the object image which was transferred to the temporary storage area 3 is output as a serial video signal for the next one field interval T.

As described above, according to the present invention, the high shutter speed can be derived by reducing the storage interval $T_{INT}$ by the output of the clear pulses CP. Therefore, the problem which is caused by providing the mechanical shutter, PLZT electronic shutter, stroboscopic flash, or the like, the problem which is caused by the high-speed scan of the CCD solid state image pickup device, and the like as in the conventional camera are not caused.

In other words, since the camera can be simply constituted by merely adding the counter 10, clear pulse generator 11, and OR gates 12, and 13, the cost and size can be easily reduced and the life is prolonged. There is no need to us the stroboscopic flash and an unpleasant feeling due to this flash is not given and the use condition of the camera is not limited. The problem of the deterioration in sensitivity is not caused except for the deterioration of the sensitivity due to the reduction of the storage interval $T_{INT}$ (such a sensitivity deterioration also occurs in the case of the mechanical shutter or the like).

Accordingly, the invention can be applied to the wide fields such as camera of the apparatus for visually recognizing and discriminating an object which moves on the conveyer, eyes of the robot, detection and recognition (reading of the number plate) of the vehicle which runs at a high speed, and the like.

Figure 5:
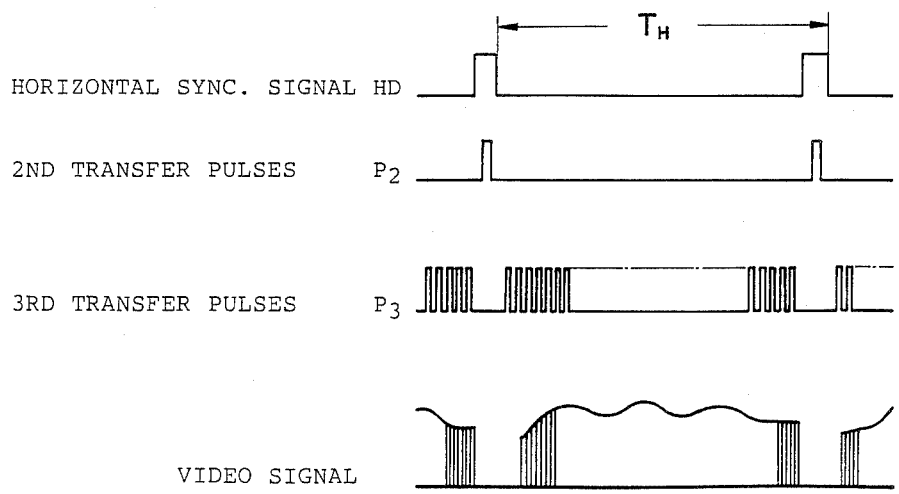

Another embodiment of the present invention will now be explained with reference to FIGS. 3 to 5. This embodiment relates to a still image pickup camera of the non-interlace type.

Figure 3:
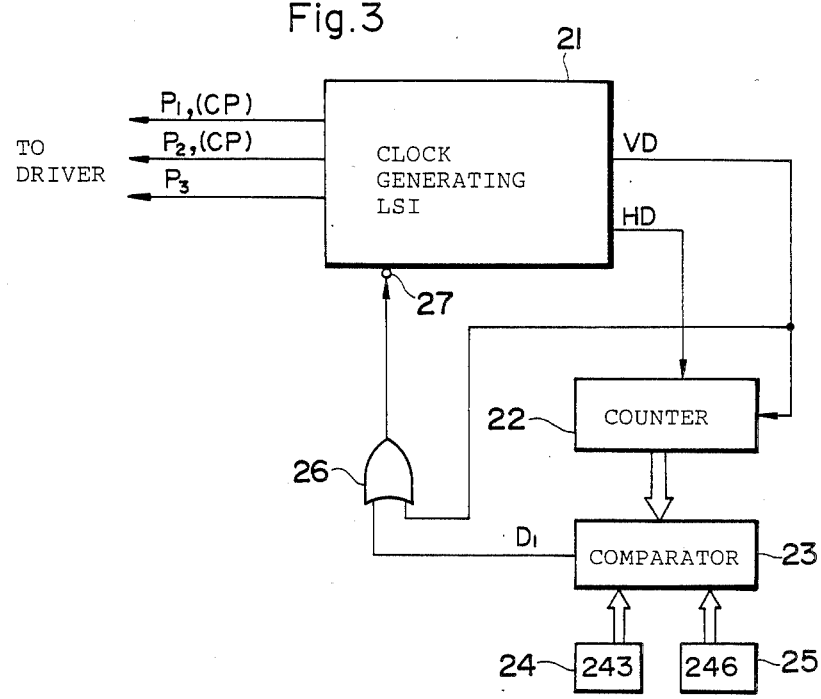
FIGS. 3 to 5 show another embodiment of the invention, FIG. 3 being a block diagram showing a part of a still image pickup camera, FIG. 4 being a time chart for explaining the operation of the camera of FIG. 3 and FIG. 5 being a detailed time chart in one horizontal scan period.
Figure 4:
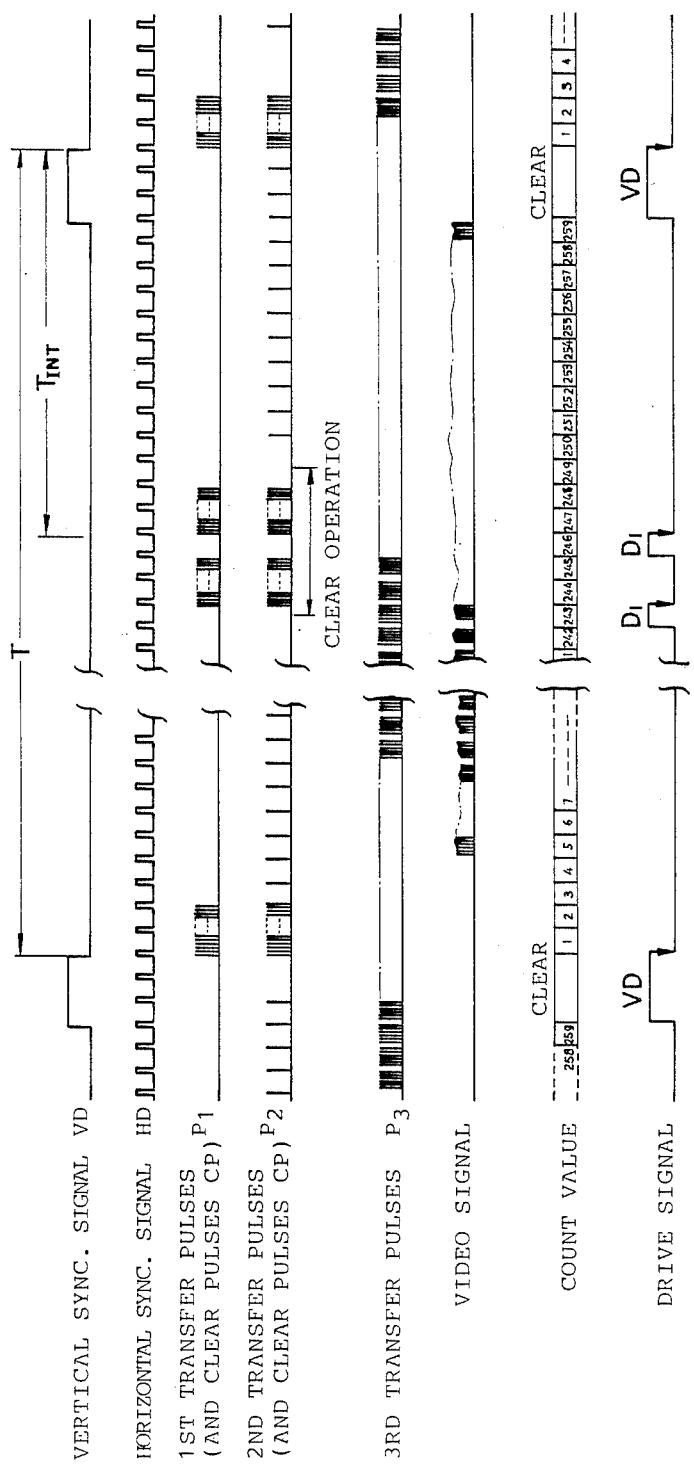

FIG. 3 is a block circuit diagram showing a part of a still image pickup camera. FIG. 4 is a time chart for explaining the operation of the camera of FIG. 3. FIG. 5 is an enlarged time chart for explaining the operation of one horizontal scan period $T_H$.

In FIG. 3, the clear pulse generator is not provided. In addition to the vertical sync signal VD, horizontal sync signal HD, and first to third transfer pulses $P_1$, $P_2$, and $P_3$, the clear pulses CP are output from a clock generating LSI 21 to the signal transmission lines of the transfer pulses $P_1$ and $P_2$. The high-speed transfer pulses $P_1$ and $P_2$ and the clear pulses CP are substantially identical except that the output timings differ. When a drive signal is input to an input terminal 27, the LSI 21 generates the high-speed pulses ($P_1$, $P_2$, and CP) from the time point of the trailing edge of the drive signal. The drive signal is given by an OR gate 26. The vertical sync signal VD and an output $D_1$ of a comparator 23 are input to the OR gate 26. The comparator 23 compares the count value of a counter 22 with the preset values of first and second setting circuits 24 and 25 and when they coincide, respectively, the comparator 23 generates the output $D_1$.

It is assumed that the number of vertical pixels in the image pickup area 2 and temporary storage area 3 is "244" and the number of horizontal pixels is "780". It is also assumed that the count value (the number of horizontal sync signals HD) which is counted by the counter 22 for one field interval T is "259", the set value of the first setting circuit 24 is "243", and the set value of the second setting circuit 25 is "246".

The counter 22 is cleared in response to the leading edge of the vertical sync signal VD and starts counting the horizontal sync signals HD from the time point of the trailing edge of the vertical sync signal VD. When the count value coincides with the set value "243" which was set to the first setting circuit 24, a drive signal $D_1$ is output from the comparator 23 and input to the clock generating LSI 21 through the OR gate 26. Therefore, the LSI 21 respectively outputs the 244 or more number of continuous first high-speed transfer pulses $P_1$ and second high-speed transfer pulses $P_2$ as the clear pulses CP. Thus, all of the image data of one field of the temporary storage area 3 is transferred to the horizontal shift register 4 to vanish. All of the image data of one field of the image pickup area 2 is also transferred to the temporary storage area 3. Thus, all of the pixels in the image pickup area 2 are cleared.

When the count value of the counter 22 coincides with the set value "246" which was set to the second setting circuit 25, the 244 or more number of continuous first high-speed transfer pulses $P_1$ and second high-speed transfer pulses $P_2$ are generated as the clear pulses CP from the LSI 21, respectively. All of the image data of one field in the temporary storage area 3 is transferred to the horizontal shift register 4 and at the same time, the almost empty image data of one field is transferred from the image pickup area 2, so that all of the pixels in the temporary storage area 3 are cleared. The completion of the transfer of the all image data of one field in the image pickup area 2 to the temporary storage area 3 results in that all of the image data in the image pickup area 2 is also cleared again.

The signal charges are stored into the image pickup area 2 for the period of time after the start of the second clearing operation until the trailing edge of the next vertical sync signal VD. Namely, this storage interval is equal to $T_{INT}$. The signal charges of one field which were stored in the image pickup area 2 for the storage interval $T_{INT}$ are transferred to the temporary storage area 3 by the 244 continuous first high-speed transfer pulses $P_1$ which are output from the LSI 21 at the timing of the trailing edge of the vertical sync signal VD which is input through the OR gate 26. At the same time, the 244 continuous second high-speed transfer pulses $P_2$ are input to the temporary storage area 3. However, since no signal charge exists in the temporary storage area 3, the data which is transferred to the horizontal shift register 4 is meaningless as the image data.

The image data of one field which had been stored in the image pickup area 2 for the storage interval $T_{INT}$ and has been transferred to the temporary storage area 3 by the 244 continuous first high-speed transfer pulses $P_1$ is output as a video signal in the following manner.

In addition to the 244 continuous second high-speed transfer pulses $P_2$, the LSI 21 outputs the second transfer pulses $P_2$ synchronously with the horizontal sync signal HD. For one horizontal scan period TH, the LSI 21 further generates the continuous third transfer pulses $P_3$ of the number which is equal to or larger than the number (780) of pixels of one horizontal line to the horizontal shift register 4.

The image data of one horizontal line is transferred from the temporary storage area 3 to the horizontal shift register 4 by the second transfer pulses $P_2$ synchronized with the horizontal sync signal HD. The image data transferred to the horizontal shift register 4 is sent to the outside by the amount of every pixel each time the third transfer pulse $P_3$ is input. The image data of one horizontal line is output as a video signal within one horizontal scan period $T_H$ by the 780 third transfer pulses $P_3$. The above operations are repeated whenever the second transfer pulse $P_2$ synchronized with the horizontal sync signal HD is input. When those operations are repeated 244 times, the image data of one field is output as a video signal.

Since the video signal of one field is produced by the signal charges which have been stored in the image pickup area 2 for the relatively short storage interval $T_{INT}$, even when an object is moving, the object image can be photographed as a still image.

Since not only the image pickup area 2 but also the temporary storage area 3 are all cleared by the second all clearing operation, the blooming is suppressed. The case of all clearing the image pickup area 2 and temporary storage area 3 only once is also obviously incorporated in the present invention.

What is claimed is:

1. A still image pickup camera comprising:
   a solid state image pickup device having an image pickup area, a temporary storage area, and a horizontal shift register;
   clock generating means for outputting within a vertical blanking period a group of first high-speed transfer pulses to transfer storage signal charges of one field in said image pickup area to said temporary storage area, for outputting within one field interval a group of second transfer pulses to transfer the storage signal charged of one field in the temporary storage area by an amount of every horizontal line synchronously with a horizontal sync signal to said horizontal shift register, and for outputting every horizontal scan period a group of third high-speed transfer pulses to transfer the image data of one horizontal line, by an amount of every pixel, which has been transferred to the horizontal shift register;
   clear pulse generating means for generating one or more times a group of high-speed clear pulses at a desired timing in an interval between adjacent vertical sync signals; and
   means for feeding said group of high-speed clear pulses to both said image pickup area and temporary storage area to clear both these areas.

2. A camera according to claim 1, wherein said clear pulse generating means generates the group of clear pulses twice at timings which are very close.

3. A camera according to claim 1, wherein said clock generating means generates the second high-speed transfer pulses, simultaneously with the first high-speed transfer pulses, to transfer the signal charges of one field in said temporary storage area to said horizontal shift register.

* * * * *